United States Patent [19]
Akamatsu et al.

[11] Patent Number: 5,983,331
[45] Date of Patent: Nov. 9, 1999

[54] SEMICONDUCTOR INTEGRATED CIRCUIT HAVING A PLURALITY OF CHIPS

[75] Inventors: Hironori Akamatsu; Toshio Yamada, both of Osaka; Hisakazu Kotani, Hyogo; Yoshiro Nakata, Nara, all of Japan

[73] Assignee: Matsushita Electric Industrial Co., Ltd., Osaka, Japan

[21] Appl. No.: 08/943,411

[22] Filed: Sep. 30, 1997

Related U.S. Application Data

[63] Continuation of application No. 08/530,428, Sep. 19, 1995, abandoned.

[30] Foreign Application Priority Data

Sep. 21, 1994 [JP] Japan .................................. 6-226634

[51] Int. Cl.⁶ .................................................. G06F 12/00
[52] U.S. Cl. .......................... 711/170; 711/105; 711/106; 711/172; 365/51
[58] Field of Search ..................................... 711/170, 171, 711/172, 102, 103, 104, 105, 106; 326/47, 41, 101; 364/490, 491; 365/51

[56] References Cited

U.S. PATENT DOCUMENTS

| | | | |
|---|---|---|---|
| 4,627,046 | 12/1986 | Bellamy | 370/359 |
| 5,175,836 | 12/1992 | Morgan | 711/172 |
| 5,237,672 | 8/1993 | Ing-Simmons et al. | 711/211 |
| 5,475,262 | 12/1995 | Wang et al. | 257/698 |
| 5,490,041 | 2/1996 | Furukawa et al. | 361/777 |
| 5,504,875 | 4/1996 | Mills et al. | 711/171 |
| 5,517,515 | 5/1996 | Spall et al. | 324/73.1 |
| 5,530,753 | 6/1996 | Easter et al. | 380/4 |
| 5,535,368 | 7/1996 | Ho et al. | 711/170 |
| 5,630,099 | 5/1997 | MacDonald et al. | 711/172 |
| 5,638,529 | 6/1997 | Yee et al. | 711/106 |

OTHER PUBLICATIONS

Commercialization of Cost–Effective MCM for Mobile Communication Devices, Nikkei Microdevices, Feb. ,1994, pp. 90–91 and English Abstract.

*Primary Examiner*—Reginald G. Bragdon
*Attorney, Agent, or Firm*—McDermott, Will & Emery

[57] ABSTRACT

A CPU acting as a mother chip, in combination with a DRAM acting as a subsidiary chip, is mounted. A mode output circuit is able to set the storage capacity of the DRAM as well as the refresh cycle of the DRAM for forwarding to a mode input circuit of the CPU through a mode output terminal of the DRAM and a mode input terminal of the CPU. The CPU controls an address generator according to the data from the mode input circuit, to set the number of bits of address data for access to the DRAM according to the DRAM storage capacity and the DRAM refresh cycle.

12 Claims, 14 Drawing Sheets

SEMICONDUCTOR INTEGRATED CIRCUIT HAVING A PLURALITY OF CHIPS

This is a file wrapper continuation application of application Ser. No. 08/530,428 filed Sept. 19, 1995 now abandoned.

BACKGROUND OF THE INVENTION

This present invention relates generally to a semiconductor integrated circuit (SIC) formed of a plurality of chips of different types.

The level of SIC integration, especially the level of DRAM integration, has been increased rapidly in recent years, in other words the number of devices per chip has been quadruplicated every three years. System on silicon, which is a structure capable of mounting one system on one chip, is no longer an impracticable idea.

Meanwhile, recent improvements in packaging technology expedites an approach of forming one system with a plurality of chips. NIKKEI MICRODEVICES (pp. 90–91, published February 1994 shows a multi-chip module (MCM) that is implemented by mounting chips with their surfaces facing each other by means of a face-to-face packaging technique.

Conventional packaging techniques, however, have some drawbacks. There are constraints on the type of terminal and on the placement/location of terminals and, conventionally, only specific chips are allowed to be mounted onto a single chip.

FIG. 14 is a conceptual diagram useful in understanding prior art packaging technique problems. A mother chip X, in combination with a subsidiary chip x, is mounted, and a mother chip Y, in combination with a subsidiary chip y, is mounted, and a mother chip Z, in combination with a subsidiary chip z, is mounted. An interface section 91 of the mother chip X corresponds to only the subsidiary chip x and an interface section 94 of the subsidiary chip x corresponds to only the mother chip X. An interface section 92 of the mother chip Y corresponds to only the subsidiary chip y and an interface section 95 of the subsidiary chip y corresponds to only the mother chip Y. An interface section 93 of the mother chip Z corresponds to only the subsidiary chip z and an interface section 96 of the subsidiary chip z corresponds to only the mother chip Z.

Accordingly, when trying to mount the mother chip X in combination with the subsidiary chip y, the interface section 91 of the mother chip X must be re-designed for correspondence with the subsidiary chip y and, additionally, the interface section 95 of the subsidiary chip y must be re-designed for correspondence with the mother chip X. For example, when mounting the subsidiary chip x onto each of the mother chips X, Y, Z, three different subsidiary chips which have the same function as the subsidiary chip x and which are designed in such a way as to correspond to the mother chips X, Y, Z respectively must be prepared. As the number of combinations of subsidiary chips and mother chips increases, much more time is required for the design of chips and the cost of manufacturing chips increases.

SUMMARY OF THE INVENTION

It is therefore an object of the present invention to provide an improved semiconductor integrated circuit which is formed of a plurality of chips of different types and which contributes neither to prolonging the design period nor to increasing the production cost even when the number of mother-subsidiary chip combinations increases.

According to the present invention, there is provided a semiconductor integrated circuit that comprises:

(a) a first chip having thereon terminals;
(b) a second chip having thereon terminals connected with said terminals of said first chip;
   said second chip including means for outputting information descriptive of a structure for said second chip;
   said first chip including means for receiving said second chip structure information and for specifying, based on said second chip structure information, a structure for said first chip.

The first chip receives information about the second chip structure and specifies its own structure according to the received information. As a result of such arrangement, the second chip structure is reflected in the first chip structure and the degree of latitude in the first chip-second chip combination is increased. Accordingly, even if the number of combinations increases, this results neither in prolonging the design period nor in increasing the production cost.

It is preferable that in the aforesaid semiconductor integrated circuit the first chip additionally includes means for outputting information descriptive of its own structure and the second chip additionally includes means for receiving such information and for specifying its own structure according to the information received from the first chip.

The second chip receives information about the first chip structure and specifies its own structure according to the received information. As a result of such arrangement, the first chip structure is reflected in the second chip structure and the degree of latitude in the first chip-second chip combination is increased. Accordingly, even if the number of combinations increases, this results neither in prolonging the design period nor in increasing the production cost.

DETAILED DESCRIPTION OF THE INVENTION

Figure 1:
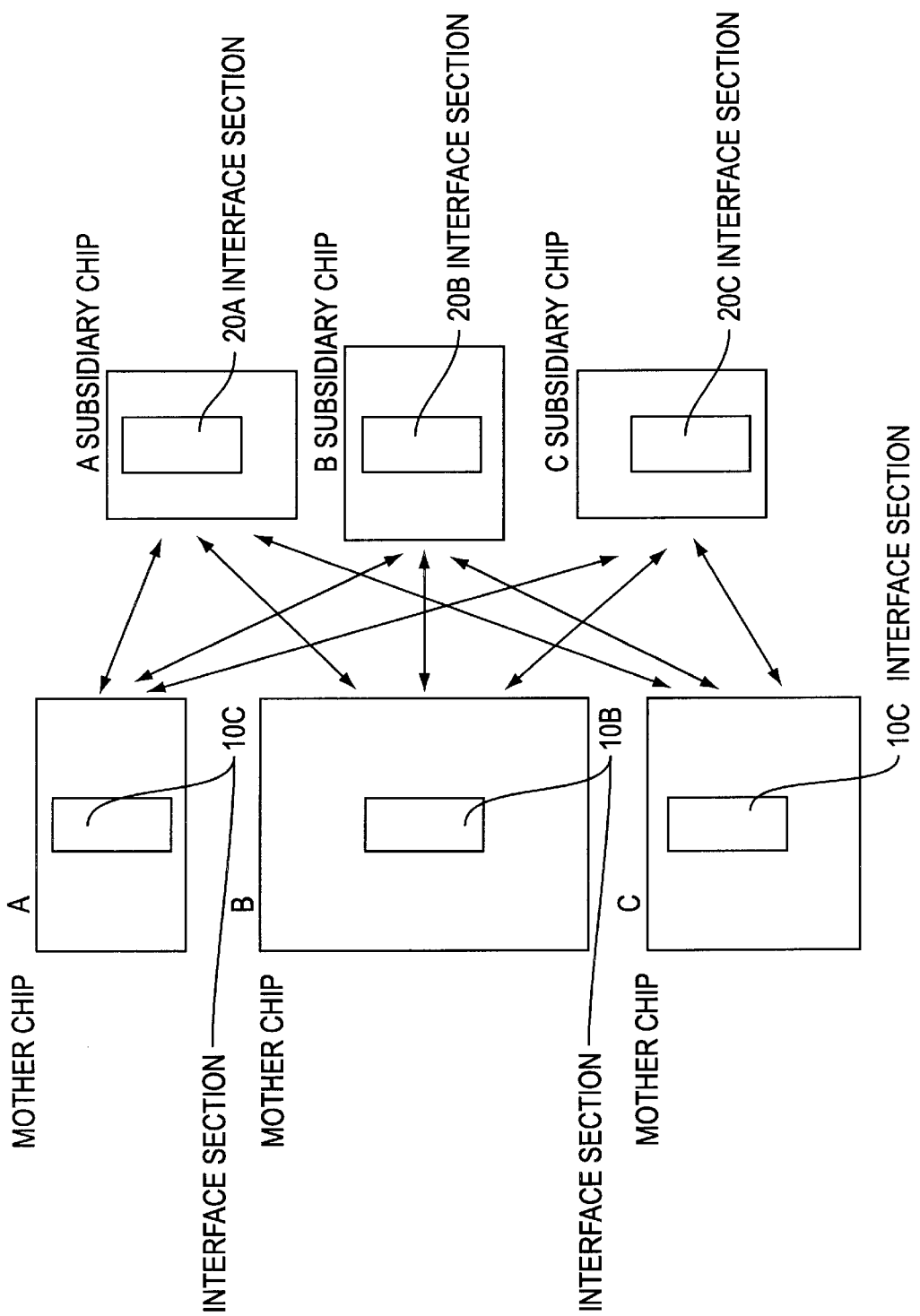
FIG. 1 is a conceptual diagram useful in understanding the aim of the present invention.

Referring first to FIG. 1, the aim of this invention is explained. A mother chip A has an interface section 10a. A mother chip B has an interface section 10b. A mother chip C has an interface section 10c. These interface sections 10a, 10b, 10c have basically the same structure. A subsidiary chip a has an interface section 20a. A subsidiary chip b has an interface section 20b. A subsidiary chip c has an interface section 20c. The interface sections 20a, 20b, 20c have basically the same structure. The interface section 10a corresponds to the subsidiary chip a, to the subsidiary chip b, and to the subsidiary chip c. The interface section 10b corresponds to the subsidiary chip a, to the subsidiary chip b, and to the subsidiary chip c. The interface section 10c corresponds to the subsidiary chip a, to the subsidiary chip b, and to the subsidiary chip c. The interface section 20a corresponds to the mother chip A, to the mother chip B, and to the mother chip C. The interface section 20b corresponds to the mother chip A, to the mother chip B, and to the mother chip C. The interface section 20c corresponds to the mother chip A, to the mother chip B, and to the mother chip C. As a result of such arrangement, subsidiary chips and mother chips can be mounted in any combination.

Figure 2:
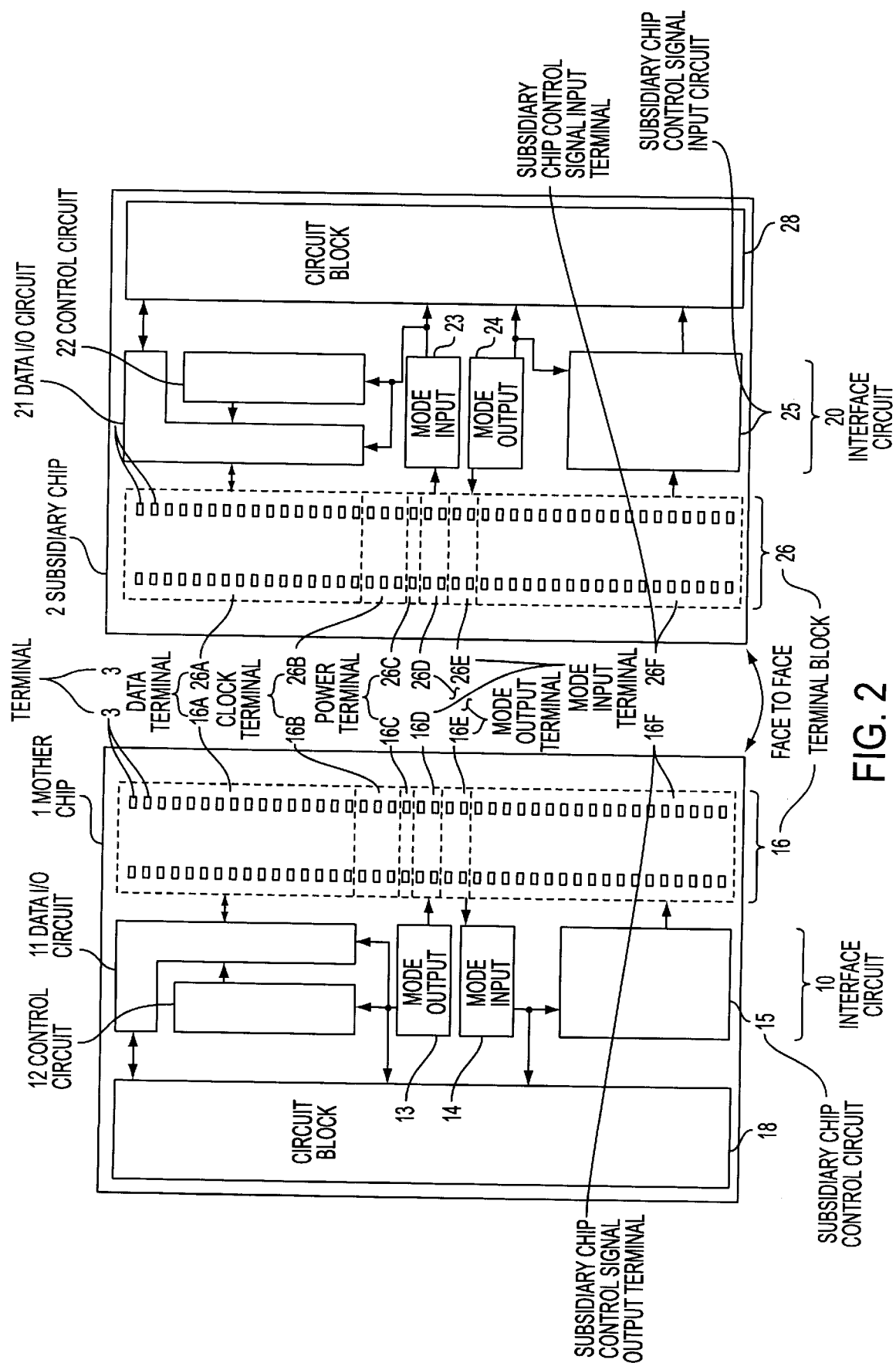
FIG. 2 outlines a semiconductor integrated circuit made in accordance with the present invention.

An embodiment of the present invention is explained. Referring now to FIG. 2, there is shown a semiconductor integrated circuit of the present invention. 1 is a mother chip of the first type. 2 is a subsidiary chip of the second type. The mother chip 1 and the subsidiary chip 2 are mounted, with their surfaces facing each other.

The mother chip 1 has an interface circuit 10 and a terminal block 16 made up of a plurality of terminals 3, for connection with the subsidiary chip 2. The interface circuit 10 is composed of a data input/output circuit 11, a control circuit 12, a mode output circuit 13, a mode input circuit 14, and a subsidiary chip control circuit 15. The terminal block 16 is composed of a data terminal 16a, a clock terminal 16b, a power terminal 16c, a mode output terminal 16d, a mode input terminal 16e, and a subsidiary chip control signal output terminal 16f. The mother chip 1 additionally has a circuit block 18 which controls main functions and which is independent of connection of the mother chip 1 with the subsidiary chip 2.

The subsidiary chip 2 has an interface circuit 20 and a terminal block 26 made up of a plurality of terminals 3, for connection with the mother chip 1. The interface circuit 20 is composed of a data input/output circuit 21, a control circuit 22, a mode input circuit 23, a mode output circuit 24, and a subsidiary chip control signal input circuit 25. The terminal block 26 is composed of a data terminal 26a, a clock terminal 26b, a power terminal 26c, a mode input terminal 26d, a mode output terminal 26e, and a subsidiary chip control signal input terminal 26f. The subsidiary chip 2 additionally has a circuit block 28 which controls main functions and which is independent of connection of the subsidiary chip 2 with the mother chip 1.

Whereas the mother chip 1 has the mode output circuit 13 and the mode input circuit 14, the subsidiary chip 2 has the mode input circuit 23 and the mode output circuit 24. The present embodiment is characterized by such arrangement. More specifically, the mother chip 1 receives from the subsidiary chip 2 information about the subsidiary chip's 2 internal structure and specifies, based on the received information, its own structure. On the other hand, the subsidiary chip 2 receives from the mother chip 1 information about the mother chip's 1 internal structure and specifies, based on the received information, its own structure.

The data terminal 16a is connected with the data terminal 26a. Data communication between the data I/O circuit 11 of the mother chip 1 and the data I/O circuit 21 of the subsidiary chip 2 is achieved through the data terminal 16a and the data terminal 26a.

The mode output circuit 13 of the mother chip 1 holds information that specifies the mother chip's 1 internal structure for forwarding to the mode output terminal 16d. The mode output terminal 16d is connected with the mode input terminal 26d. Structural information held by the mode output circuit 13 is fed to the mode input circuit 23 of the subsidiary chip 2 through the terminal 16d and the terminal 26d. The control circuit 22 of the subsidiary chip 2, upon receipt of information from the mode input circuit 23, controls the data I/O circuit 21. The control circuit 12 of the mother chip 1, upon receipt of information from the mode output circuit 13, controls the data I/O circuit 11.

The terminal 16f and the terminal 26f are coupled together. A subsidiary chip control signal, outputted from the subsidiary chip control circuit 15 of the mother chip 1, is applied to the circuit 25 through the terminal 16f and the terminal 26f.

The mode output circuit 24 of the subsidiary chip 2 holds information that specifies the subsidiary chip's 2 internal structure for forwarding to the mode output terminal 26e. The mode output terminal 26e is connected with the mode input terminal 16e. Structural information held by the mode output circuit 24 is supplied to the mode input circuit 14 of the mother chip 1 through the terminal 26e and the terminal 16e.

The clock terminal 16b and the clock terminal 26b are coupled together. The mother chip 1 applies a clock signal that drives the subsidiary chip 2, to the subsidiary chip 2 through the terminal 16b and the terminal 26b. The power terminal 16c is connected with the power terminal 26c. The mother chip 1 supplies power through the terminal 16c and the terminal 26c.

Figure 3:
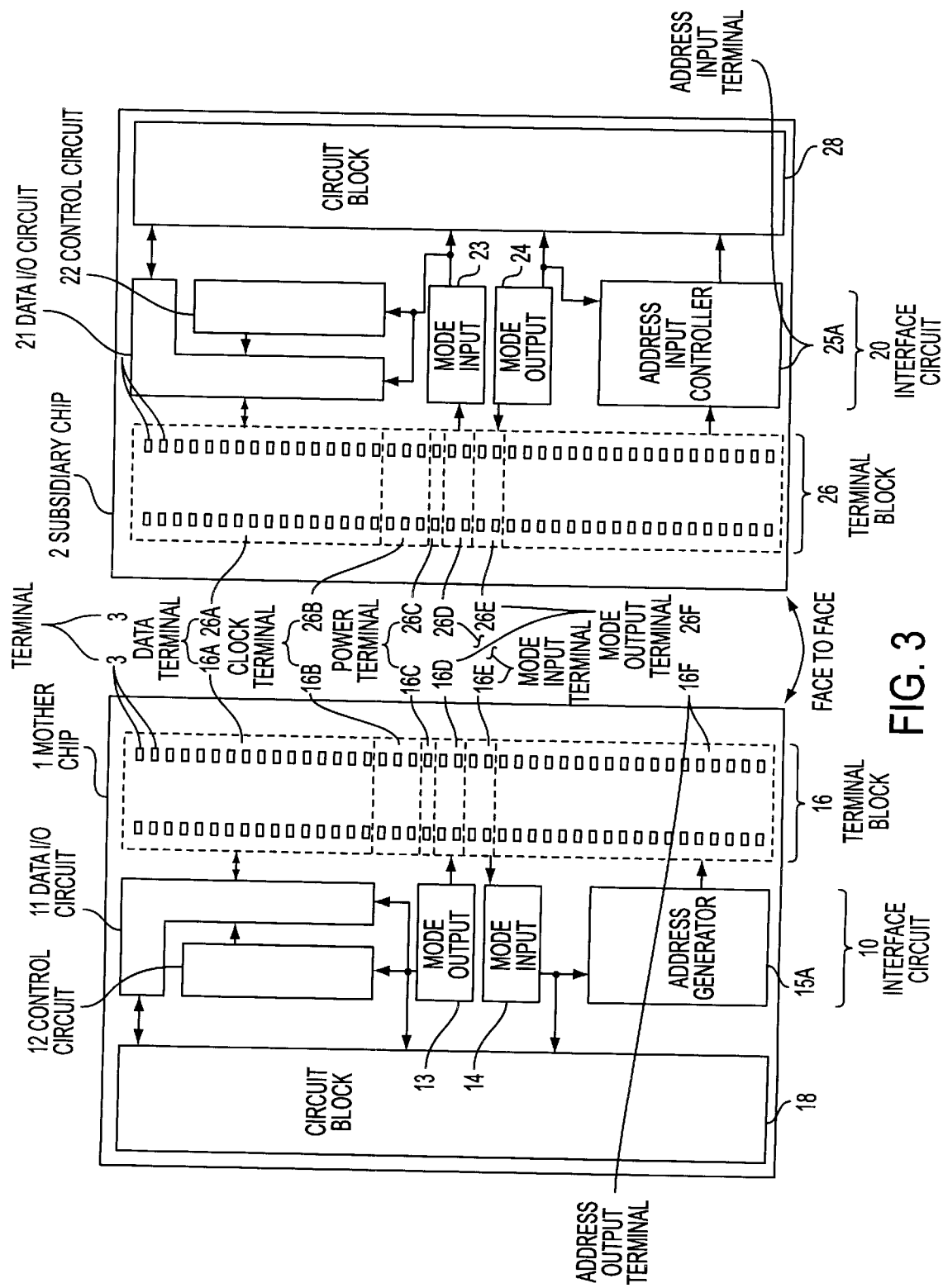
FIG. 3 outlines a semiconductor integrated circuit made in accordance with the present invention.

FIG. 3 shows an example of the semiconductor integrated circuit in accordance with the present invention. 1A is a CPU acting as a first chip. 2A is a DRAM acting as a second chip. The CPU 1A and the DRAM 2A are mounted, with their principal surfaces facing each other.

The FIG. 3 semiconductor integrated circuit has almost the same structure as the FIG. 2 semiconductor integrated circuit. In the following description, like reference numerals have been used to indicate like elements of the semiconductor integrated circuit. In the CPU 1A, an address generator 15A is provided in place of the subsidiary chip control circuit 15 and an address output terminal 16F is provided in place of the subsidiary chip control signal output terminal 16f. In the DRAM 2A, an address input control circuit 25A is provided in place of the subsidiary chip control signal input circuit 25 and an address input terminal 26F is provided in place of the subsidiary chip control signal input terminal 26f.

The mode output circuit 13 sets the number of bits of data to be transferred between the CPU 1A and the DRAM 2A, thereafter information descriptive of the result of the setting operation being supplied to the mode output terminal 16d. Such information is then fed through the mode input terminal 26d to the mode input circuit 23 of the DRAM 2A.

The mode output circuit 24 sets the storage capacity of memory and the cycle of refreshing of the DRAM 2A, thereafter information descriptive of the results of the setting operation being supplied to the terminal 26e. Such information is then fed to the mode input circuit 14 of the CPU 1A through the mode input terminal 16e.

Upon receipt of the output of the mode input circuit 14, the address generator 15A generates addresses for access to the DRAM 2A. More specifically, an address, generated by the address generator 15A, is fed to the address output terminal 16F. Then the address is fed through the address input terminal 26F to the address input control circuit 25A of the DRAM 2A.

Figure 4:
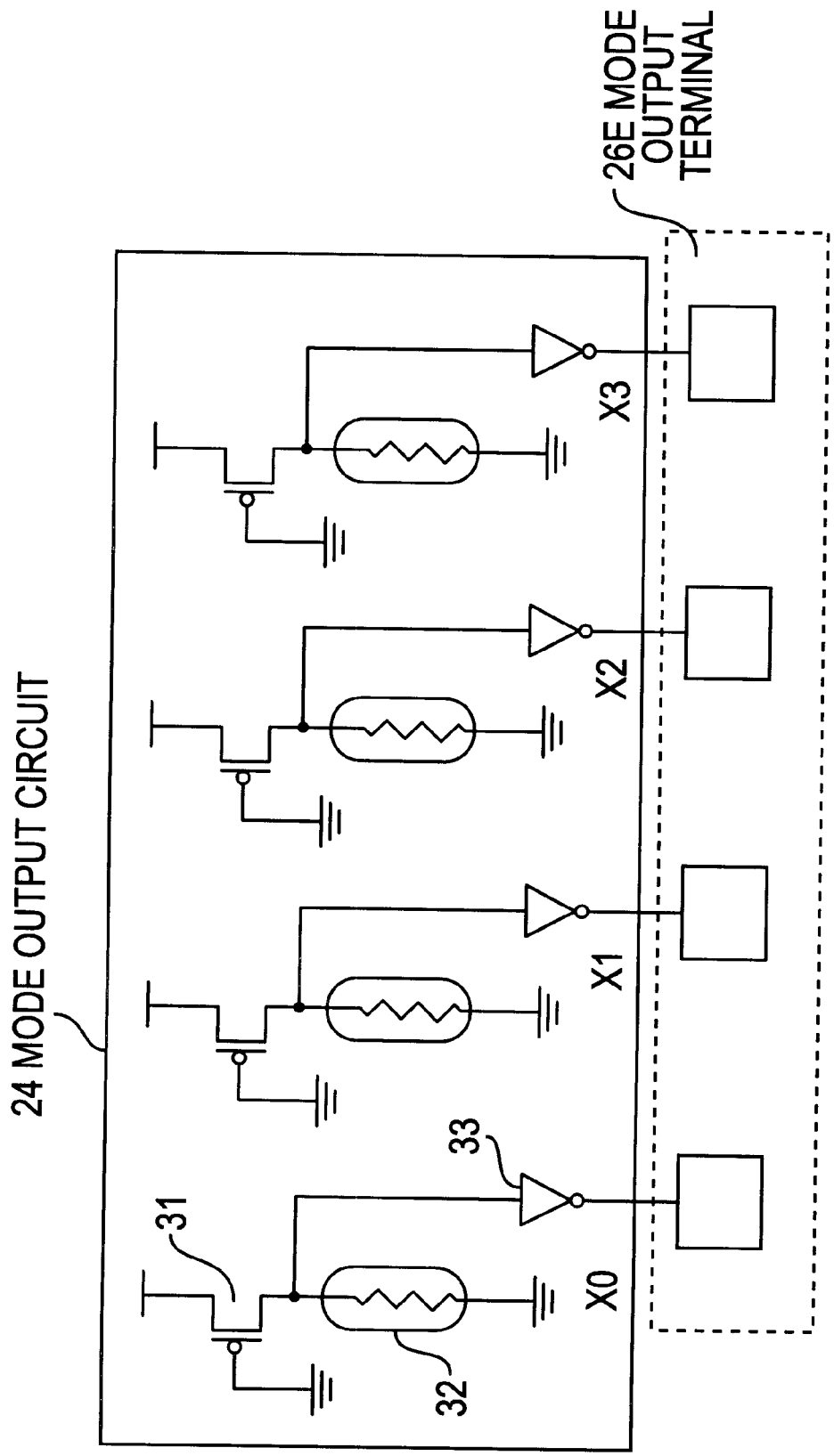
FIG. 4 illustrates a mode output circuit of a subsidiary chip in the semiconductor integrated circuit made in accordance with the present invention.

FIG. 4 shows the mode output circuit 24 of the DRAM 2A in the semiconductor integrated circuit of FIG. 3. 31 is a PMOS transistor. 32 is a fuse element. 33 is an inverter. The drain of the PMOS transistor 31 is coupled to a power supply source and the gate thereof is grounded. The source of the PMOS transistor 31 is grounded via the fuse element 32 and is connected with the inverter 33. The output of the inverter 33 is fed to the mode output terminal 26e. The output potential (high or low) of the inverter 33 depends upon the blowout of the fuse element 32, which enables the mode output circuit 24 to arbitrarily set information of four bits. In other words, the mode output circuit 24, shown in FIG. 4, is able to set 16 (=$2^4$) different types of conditions.

The mode output circuit 24 sends out signals X0–X3 to the mode input circuit 14 of the CPU 1A through the mode output terminal 26e and the mode input terminal 16e. SIGNALS X0–X3 are used for control of the address input control circuit 25A and the circuit block 28. In the present embodiment, SIGNAL X0 indicates the cycle of refreshing of the DRAM 2A and SIGNALS X1–X3 indicate the storage capacity of the DRAM 2A.

In the present embodiment, the fuse element 32 is used for the setting of information. Any other equivalent means may be used.

Figure 5:
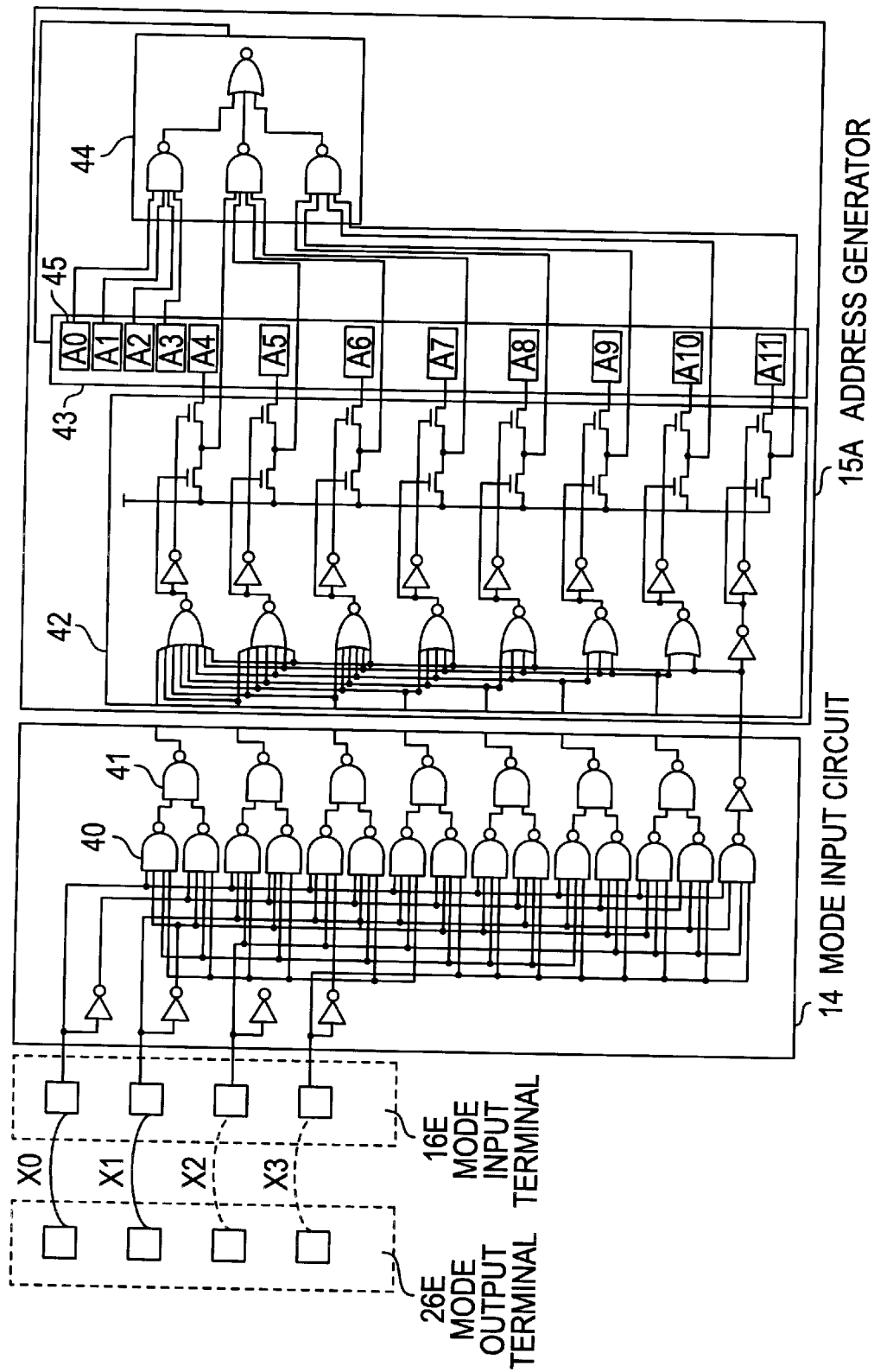
FIG. 5 illustrates a mode input circuit and an address generator of a mother chip in the semiconductor integrated circuit made in accordance with the present invention.

FIG. 5 shows the mode input circuit 14 and the address generator 15A of the CPU 1A in the FIG. 3 semiconductor integrated circuit. The mode input circuit 14 has a 4-input NAND circuit 40 and a 2-input NAND circuit 41. SIGNALS X0–X3 of the mode output circuit 24 are applied to the mode input circuit 14 through the mode output terminal 26e and the mode input terminal 16e. In the mode input circuit 14, each of SIGNALS X0–X3 is translated into a signal of eight bits for application to the address generator 15A.

The address generator 15A is composed of a counter length switch 42, a counter 43, and a reset signal generator 44. The counter 43 has an address output terminal 45 that is connected with the address output terminal 16F and address data A0-A11 are outputted. An effective bit count of ADDRESS DATA A0-A11 from the counter 43 changes by an 8-bit signal from the mode input circuit 14. More specifically, the number of bits of an address of ADDRESS DATA A0–A11 that is designated by the CPU 1A according to SIGNALS X0–X3, changes.

The SIGNAL X versus ADDRESS DATA A is shown in TABLE 1. In the column for ADDRESS DATA A0–A11, "0" indicates an invalid bit and "1" indicates a valid bit.

TABLE 1

| X3 | X2 | X1 | X0 | R. CYCLE | A11 | A10 | A9 | A8 | A7 | A6 | A5 | A4 | A3 | A2 | A1 | A0 |
|----|----|----|----|----------|-----|-----|----|----|----|----|----|----|----|----|----|----|
| 0 | 0 | 0 | 0 | 16 | 0 | 0 | 0 | 0 | 0 | 0 | 0 | 0 | 1 | 1 | 1 | 1 |
| 0 | 0 | 0 | 1 | 32 | 0 | 0 | 0 | 0 | 0 | 0 | 0 | 1 | 1 | 1 | 1 | 1 |
| 0 | 0 | 1 | 0 | | | | | | | | | | | | | |
| 0 | 0 | 1 | 1 | 64 | 0 | 0 | 0 | 0 | 0 | 0 | 1 | 1 | 1 | 1 | 1 | 1 |
| 0 | 1 | 0 | 0 | | | | | | | | | | | | | |
| 0 | 1 | 0 | 1 | 128 | 0 | 0 | 0 | 0 | 0 | 1 | 1 | 1 | 1 | 1 | 1 | 1 |
| 0 | 1 | 1 | 0 | | | | | | | | | | | | | |
| 0 | 1 | 1 | 1 | 256 | 0 | 0 | 0 | 0 | 1 | 1 | 1 | 1 | 1 | 1 | 1 | 1 |
| 1 | 0 | 0 | 0 | | | | | | | | | | | | | |
| 1 | 0 | 0 | 1 | 512 | 0 | 0 | 0 | 1 | 1 | 1 | 1 | 1 | 1 | 1 | 1 | 1 |
| 1 | 0 | 1 | 0 | | | | | | | | | | | | | |
| 1 | 0 | 1 | 1 | 1K | 0 | 0 | 1 | 1 | 1 | 1 | 1 | 1 | 1 | 1 | 1 | 1 |
| 1 | 1 | 0 | 0 | | | | | | | | | | | | | |
| 1 | 1 | 0 | 1 | 2K | 0 | 1 | 1 | 1 | 1 | 1 | 1 | 1 | 1 | 1 | 1 | 1 |
| 1 | 1 | 1 | 0 | | | | | | | | | | | | | |
| 1 | 1 | 1 | 1 | 4K | 1 | 1 | 1 | 1 | 1 | 1 | 1 | 1 | 1 | 1 | 1 | 1 |

In FIG. 5, the counter 43 is not circuit-diagramed. Any type of circuit may be used to construct the counter 43 as long as its output can be reset by a reset pulse generated by the reset signal generator 44.

In the present embodiment, the counter 43 performs only sequential address increment operations. Any way of generating addresses may be used.

Figure 6:
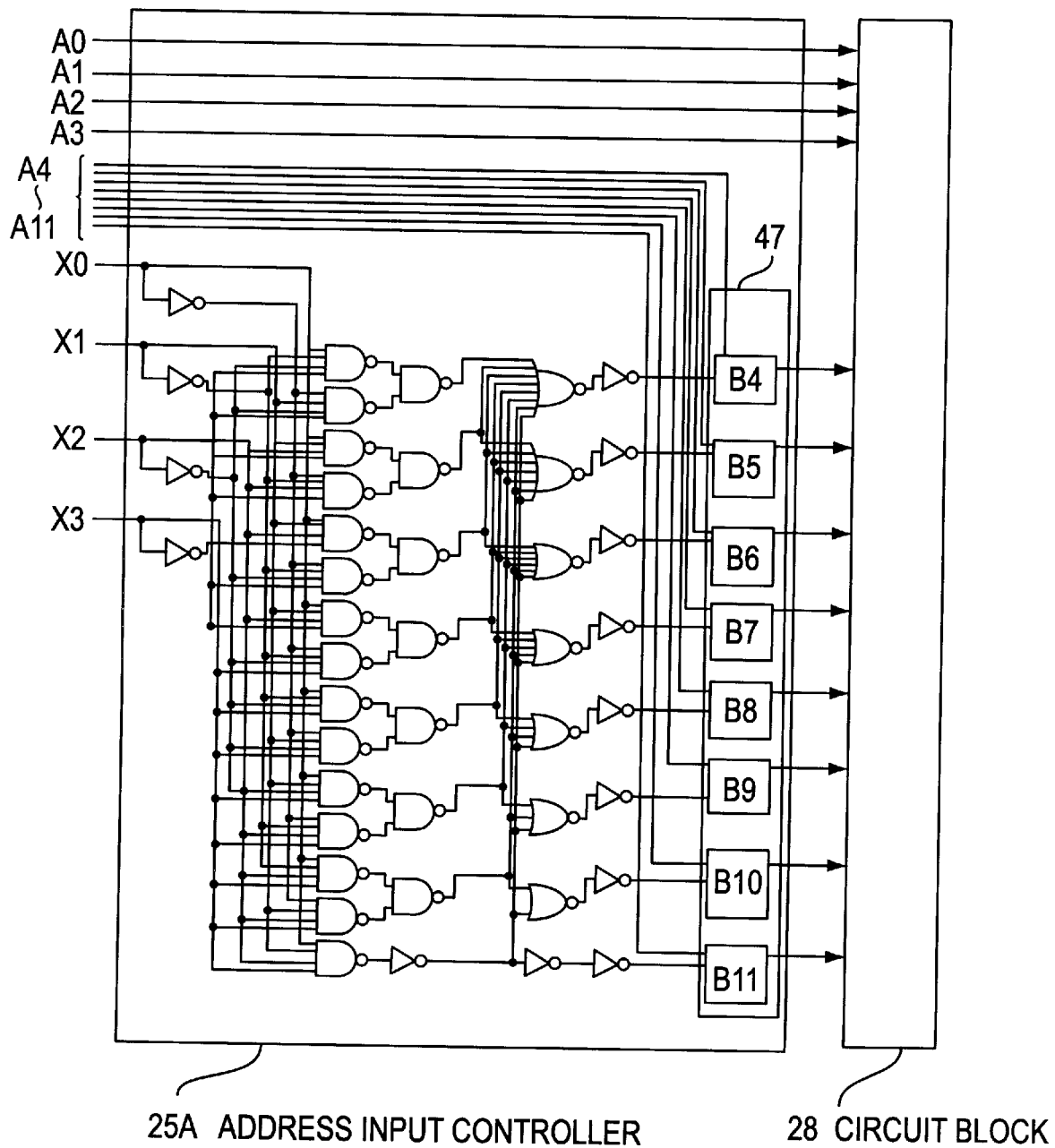
FIG. 6 illustrates an address input control circuit of a subsidiary chip in the semiconductor integrated circuit made in accordance with the present invention.

FIG. 6 shows the address input control circuit 25A of the DRAM 2A in the FIG. 3 semiconductor integrated circuit.

The address input control circuit 25A, shown in FIG. 6, is a combination of the mode input circuit 14 and the address generator 15A. The address input control circuit 25A additionally has an address transfer decision circuit 47.

The address input control circuit 25A receives ADDRESS DATA A0–A11 from the address generator 15A of the CPU 1A through the address output terminal 16F and the address input terminal 26F and further receives SIGNALS X0–X3 from the mode output circuit 24 of FIG. 4. ADDRESS DATA A4–A11 are fed to the address transfer decision circuit 47. Then, the address transfer decision circuit 47 determines whether these received address data are transferred to the circuit block 28, according to the SIGNALS X0–X3. As shown in TABLE 1, since ADDRESS DATA A0–A3 are in constant use, they are direct-transferred to the circuit block 28, by-passing the address transfer decision circuit 47.

Figure 7:
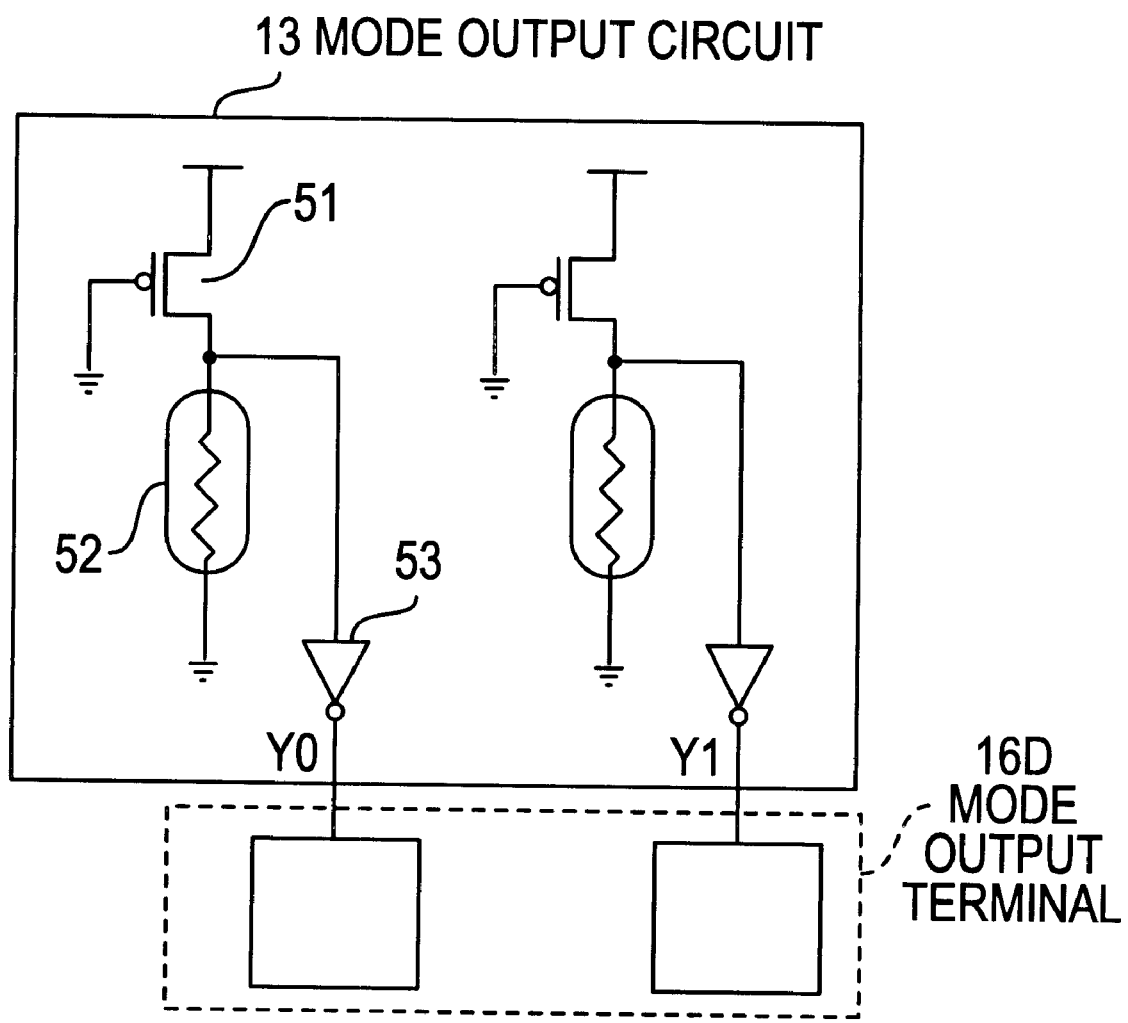
FIG. 7 illustrates a mode output circuit of a mother chip in the semiconductor integrated circuit made in accordance with the present invention.

FIG. 7 circuit-diagrams the mode output circuit 13 of the CPU 1A in the FIG. 3 semiconductor integrated circuit. The mode output circuit 13 is basically identical in circuit configuration with the mode output circuit 24 of the FIG. 4 DRAM 2A. 51 is a PMOS transistor. 52 is a fuse element. 53 is an inverter. The output potential (high or low) of the inverter 53 depends upon the blowout of the fuse element 52, which enables the mode output circuit 13 to arbitrarily set information of two bits. In other words, the mode output circuit 13, shown in FIG. 7, is able to set 4 (=$2^2$) different types of conditions.

The mode output circuit 13 outputs signals Y0 and Y1 to the mode input circuit 23 of the DRAM 2A through the mode output terminal 16d and the mode input terminal 26d. In the present embodiment, SIGNAL Y designates the number of I/O terminals (i.e., the data length) required by the CPU 1A.

Figure 8:
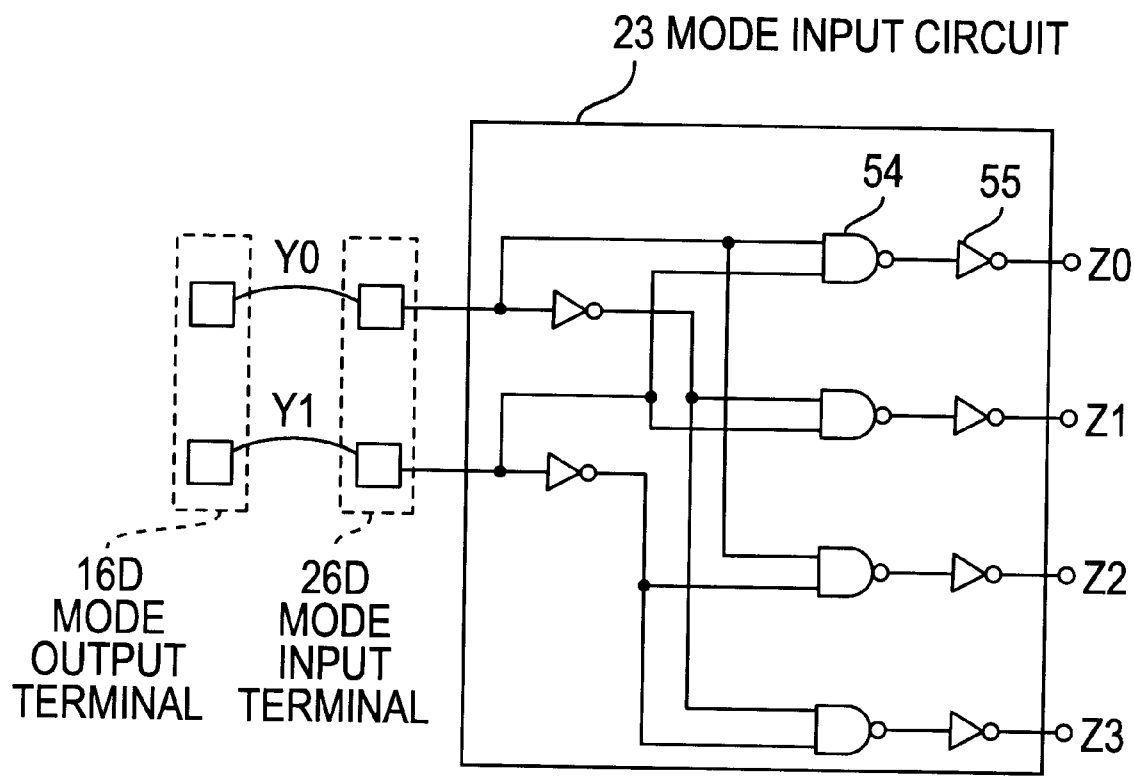
FIG. 8 illustrates a mode input circuit of a subsidiary chip in the semiconductor integrated circuit made in accordance with the present invention.

Referring to FIG. 8, there is shown the mode input circuit 23 of the DRAM 2A in the FIG. 3 semiconductor integrated circuit.

The mode input circuit 23 has a NAND circuit 54 and an inverter 55. SIGNALS Y0 and Y1 from the mode output circuit 13 are fed to the mode input circuit 23 through the mode output terminal 16d and the mode input terminal 26d. Based on SIGNAL Y, the mode input circuit 23 sends out I/O specification signals Z0–Z3.

The SIGNAL Y versus SIGNAL Z is shown in TABLE 2. In TABLE 2, if the number of I/O terminals=1, then SIGNAL Z0 becomes "1". If the number of I/O terminals=2, then SIGNAL Z1 becomes "1". If the number of I/O terminals=4, then SIGNAL Z2 becomes "1". If the number of I/O terminals=8, then SIGNAL Z3 becomes "1".

TABLE 2

| I/O | Y0 | Y1 | Z0 | Z1 | Z2 | Z3 |
|-----|----|----|----|----|----|----|
| 1 | 1 | 1 | 1 | 0 | 0 | 0 |
| 2 | 0 | 0 | 0 | 1 | 0 | 0 |
| 4 | 1 | 0 | 0 | 0 | 1 | 0 |
| 8 | 0 | 0 | 0 | 0 | 0 | 1 |

Figure 9:
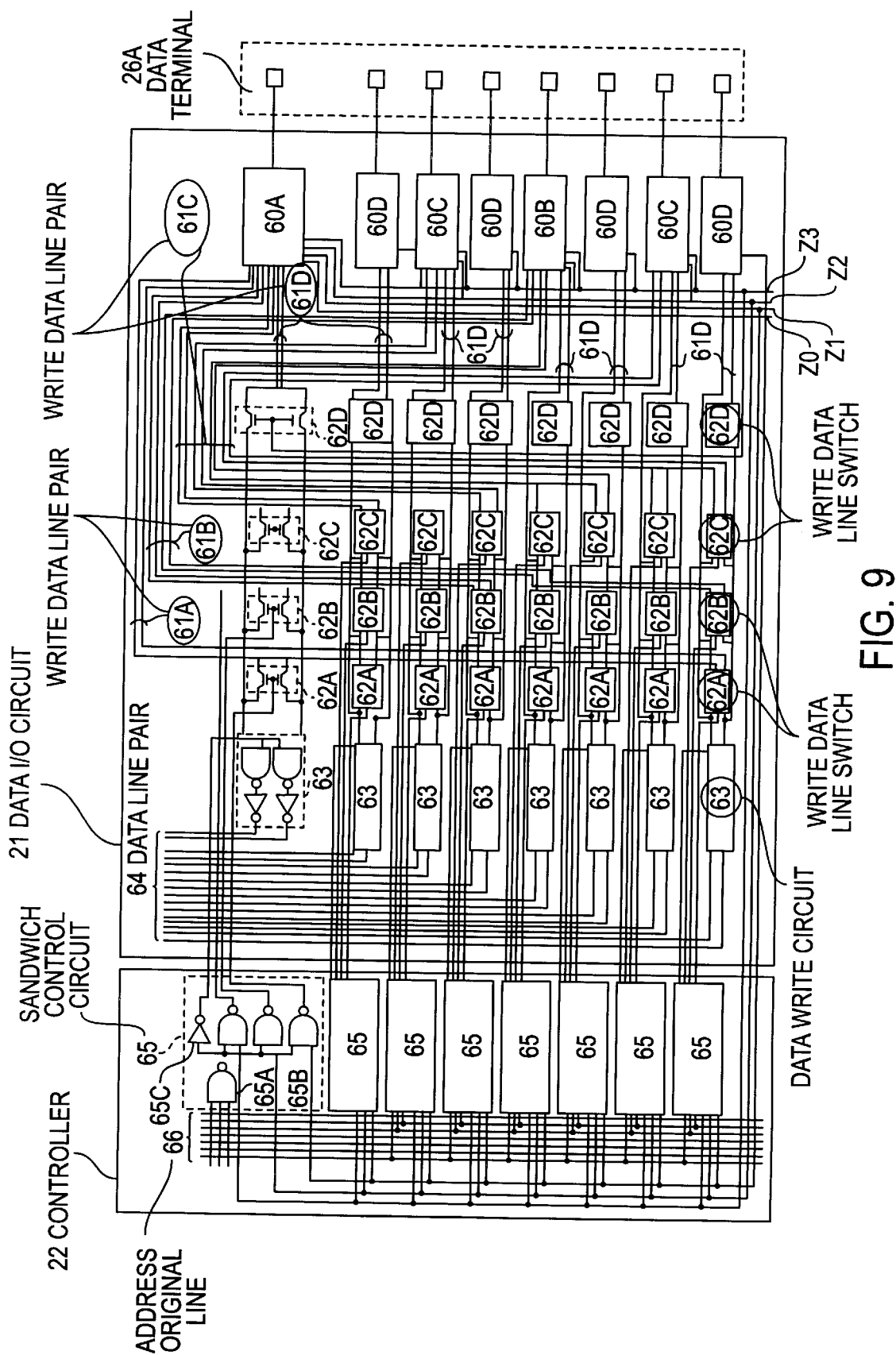
FIG. 9 illustrates a data input/output circuit and a control circuit of a subsidiary chip in the semiconductor integrated circuit made in accordance with the present invention.

FIG. 9 shows the data input/output circuit 21 and the control circuit 22 of the DRAM 2A in FIG. 3 semiconductor integrated circuit. FIG. 9 shows only circuits that relate to the write of data.

The data I/O circuit 21 has data input circuits 60a–60d. If the data length is one bit long, then only the data input circuit 60a operates. If the data length is two bits long, then only the data input circuits 60a and 60b operate. If the data length is four bits long, then the data input circuits 60a–60c operate. If the data length is eight bits long, then all the data input circuits 60a–60d operate.

61a–61d are write data line pairs. The pair 61a is for 1-bit data. The pair 61b is for 2-bit data. The pair 61c is for 4-bit data. The pair 61d is for 8-bit data.

62a–62d are write data line switches. The switch 62a is for 1-bit data. The switch 62b is for 2-bit data. The switch 62c is for 4-bit data. The switch 62d is for 8-bit data. 63 is a data write circuit. 64 is a data line pair through which data are transferred to the circuit block 28 including memory cells.

The control circuit 22 has a switch control circuit 65. The switch control circuit 65, composed of a 3-input NAND circuit 65a, a 2-input NAND circuit 65b, and an inverter 65c, controls both the data write circuit 63 and the data line switches 62a–62d. 66 is an address signal line. The address signal line 66 selects one of the data write circuits 63 and one of the write data line switches 62a–62c.

The data input/output circuit 21 receives SIGNALS Z0–Z3 from the mode input circuit 23. When the number of inputs/outputs between the CPU 1A and the DRAM 2A is designated by SIGNALS Z0–Z3 as shown in TABLE 2, the data input/out circuit 21 becomes a circuit to the number of inputs/outputs designated. For example, when the 1-bit I/O specification SIGNAL Z0 becomes "1", only the data input circuit 60a operates and one of the eight switches 62a is selected by the address signal line 66 and the switch control circuit 65 for operation.

Figure 10:
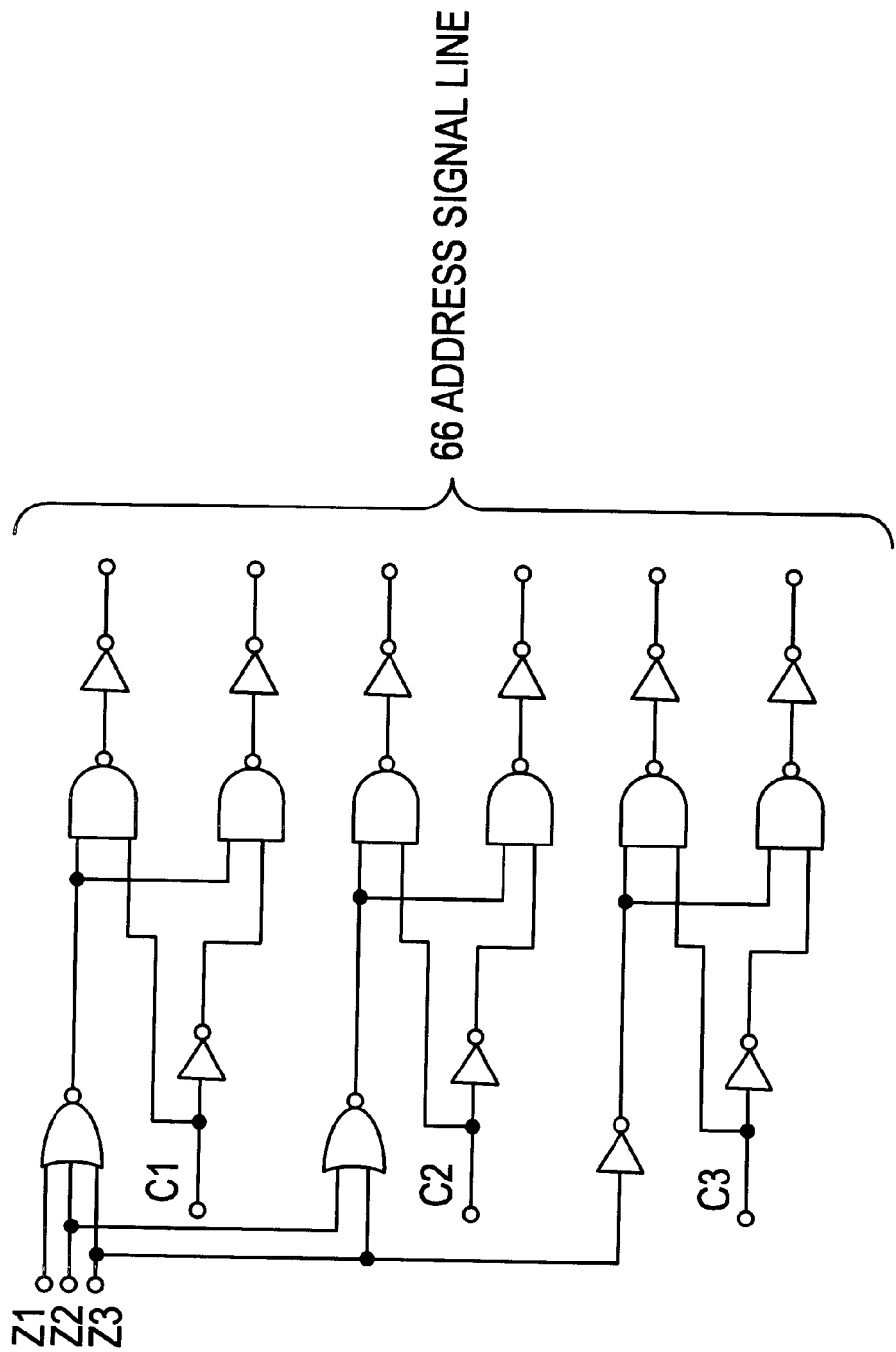
FIG. 10 illustrates a circuit for control of an address signal line of a subsidiary chip in the semiconductor integrated circuit made in accordance with the present invention.

A circuit shown in FIG. 10 controls the address signal line 66. This circuit, not shown in FIG. 3, is arranged in the circuit block 28 and receives SIGNALS Z1–Z3 as well as address original signals C1–C3. As can be seen from FIG. 10, SIGNAL C1 is applied onto the address signal line 66 when one of SIGNALS Z1–Z3 is "1" (i.e., at any of the I/O specification times other than the 8-bit I/O specification time), thereafter SIGNAL C1 being supplied to the control circuit 22. SIGNAL C2 is applied onto the address signal line 66 when either one of SIGNAL Z1 and SIGNAL Z2 is "1" (i.e., at the 2- or 1-bit I/O specification time). SIGNAL C3 is applied to the address signal line 66, only at the 1-bit I/O specification time.

Figure 11:
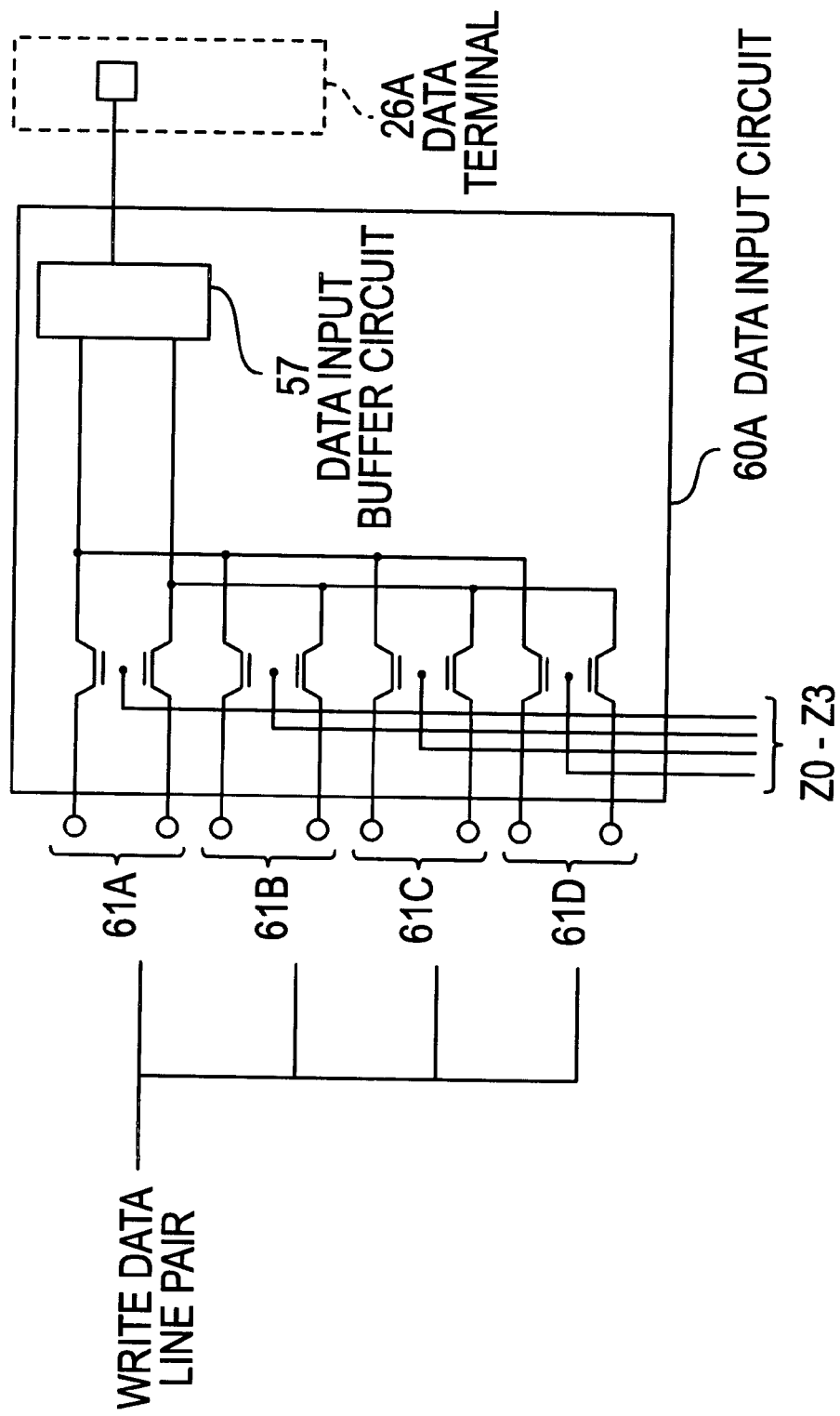
FIG. 11 illustrates a data input circuit of the FIG. 9 data input/output circuit.

Referring now to FIG. 11, there is shown the data input circuit 60a arranged within the data input/output circuit 21. 67 is a data input buffer circuit. The data input buffer circuit 67 may be constructed based on any circuit structure as long as it provides data received from the data input terminal 26a in differential form. One of the write data lines 61a–61d is selected according to SIGNALS Z0–Z3 from the mode input circuit 23 and the data input buffer circuit 67 provides its output through a selected write data line. The data input circuits 60b–60d are not circuit-diagramed, since they are identical in configuration with the data input circuit 60a shown in FIG. 11 except for the number of write data lines to be connected.

As described above, the CPU 1A is able to set the number of I/O bits at 1, 2, 4, or 8 and, at the same time, the number of I/O bits for the DRAM 2A is set as requested by the CPU 1A. In the present embodiment, the description has been made in terms of the data write circuit. A data read circuit may be implemented using the same circuit configuration as the data write circuit. Additionally, the data input/output circuit 11 and the control circuit 12 of the CPU 1A may be achieved using the same structures as the data input/output circuit 21 and the control circuit 22 of the DRAM 2A shown in FIG. 8.

Although the provision of the mode input/output terminals as well as the provision of the mode input/output terminals results in increasing the chip area, such increase in the chip area may be negligible. Particularly, terminals used in the face-to-face packaging have a narrow pitch in comparison with bonding terminals and are small in size, which means that the percentage of the terminal block area to the entire chip area is low, and that increase in the number of terminals caused by the provision of the mode input/output terminals provides no problems.

For the case of the face-to-face packaging, standardization of the location of terminals is preferable for increasing the versatility of semiconductor integrated circuit.

The clock terminal 16b, the power terminal 16c, the mode output terminal 16d, and the mode input terminal 16e are grouped at the center of the CPU 1A of FIG. 3, and the data terminal 16a and the address output terminal 16F are arranged such that they face each other across such a group. In order to mount various subsidiary chips, a type of terminal the number of which required is less dependent on the subsidiary chip structure is arranged at the center, while on the other hand a type of terminal the number of which required is more dependent on the subsidiary chip structure is arranged at the sides. Increase or decrease in the number of terminals of the latter type is absorbed by shifting the location of subsidiary chip ends back and forth.

Figure 12:
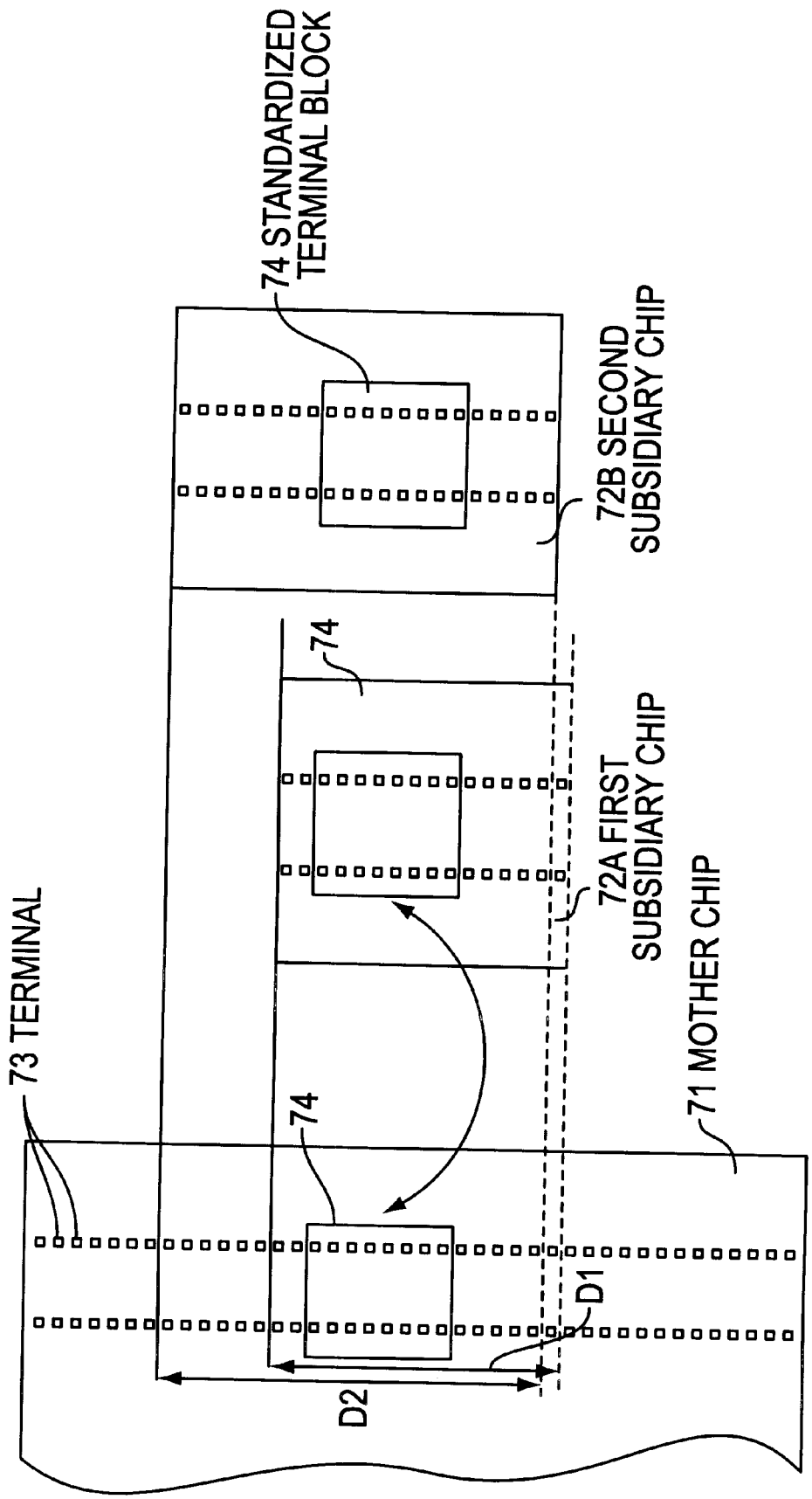
FIG. 12 is a diagram illustrating an example of the packaging in which two types of subsidiary chips are mounted onto a single mother chip.

Referring now to FIG. 12, chips of different types are mounted onto one mother chip. 71 is a mother chip. 72a is a first subsidiary chip. 72b is a second subsidiary chip. 73 is a terminal. 74 is a standardized terminal block made up of terminals of the aforesaid former type such as clock input/output terminals, power terminals, and mode input/output terminals.

As shown in FIG. 12, because of the provision of the terminal block 74, the first and second subsidiary chips 72a and 72b of different sizes can be mounted onto the mother chip 71. When the first subsidiary chip 72a is mounted, only terminals covered by a length of $d_1$ of the mother chip 71 are used, in other words, the remaining other terminals are left unconnected. When the second subsidiary chip 72b is mounted, only terminals converted by a length of $d_2$ are used, in other words the remaining other terminals are left unconnected. Although a way of processing such unconnected terminals is not explained here, it may be easily controlled using information from a mode input/output terminal.

Figure 13:
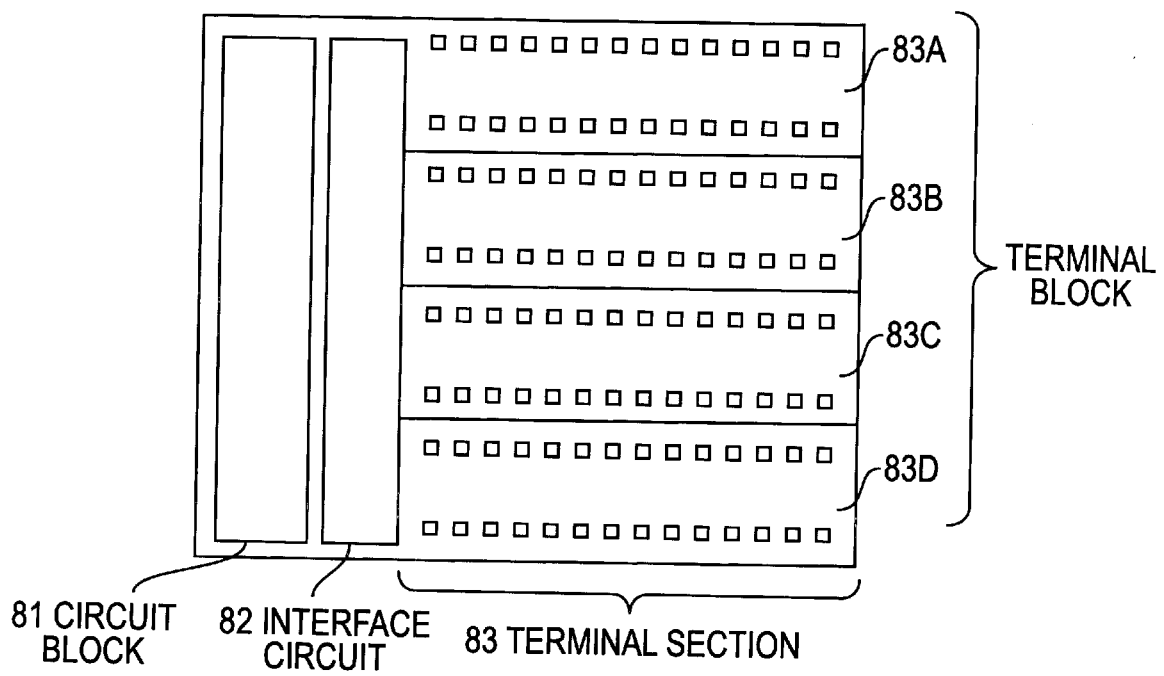
FIG. 13 shows a mother chip capable of being mounted four subsidiary chips.
Figure 14:
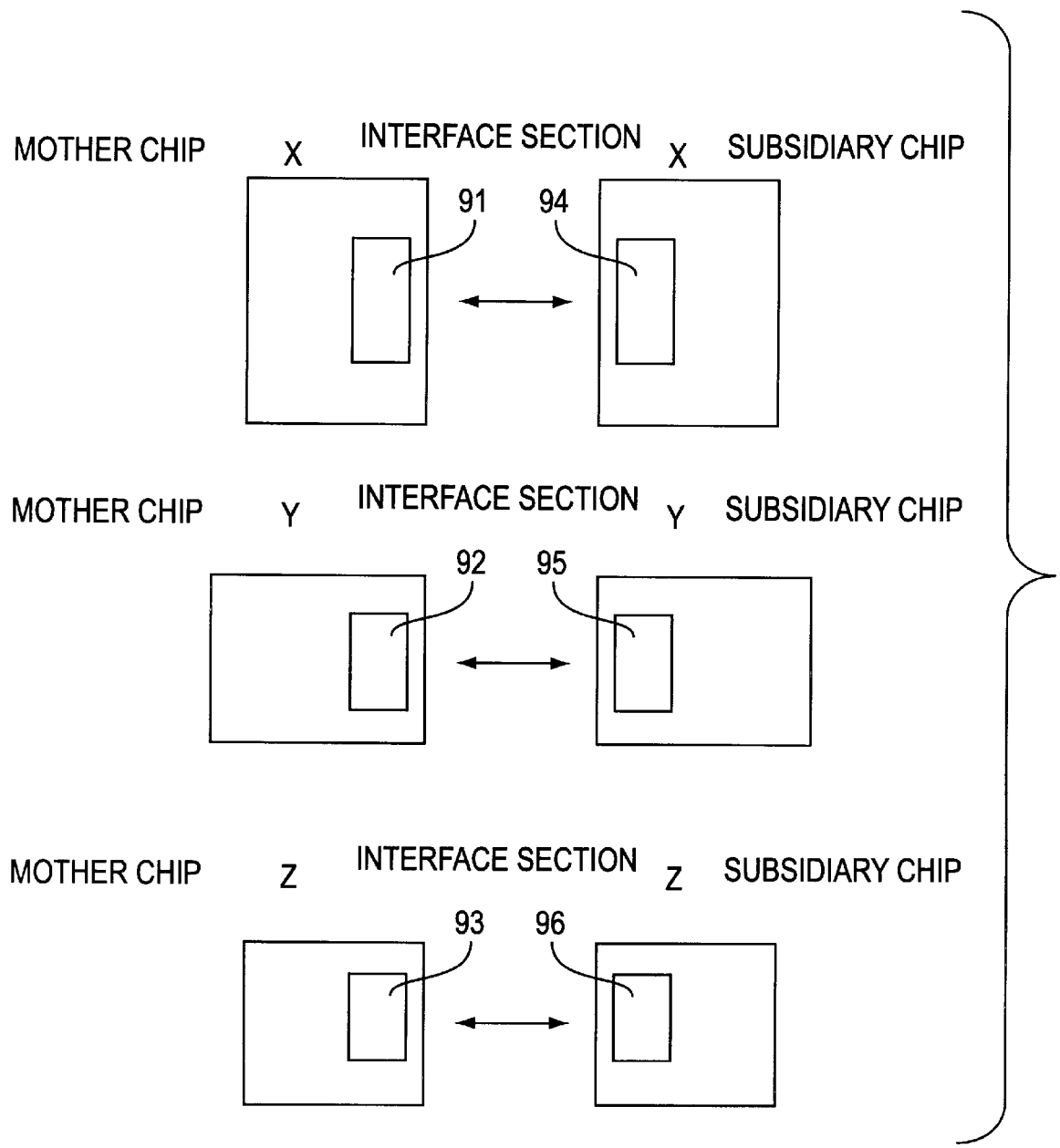
FIG. 14 is a conceptual diagram useful in understanding prior art packaging technique problems.

The present embodiment may be used in mounting a plurality of subsidiary chips onto one mother chip. FIG. 13 shows a mother chip structure capable of mounting four subsidiary chips onto one mother chip. 81 is a circuit block. 82 is an interface circuit. 83 is a terminal section. The terminal section 83 is made up of four terminal blocks 83a–83d and each terminal block 83a–83d is employed for connection with a respective subsidiary chip. The interface circuit 82 has mode output circuits and mode input circuits corresponding to four subsidiary chips.

The present embodiment has been described in terms of the mounting of a DRAM acting as a subsidiary chip onto a mother chip. Different memories such as SRAMs and EEPROMs may be used as subsidiary chips.

Additionally, chips mounted on the wafer may be examined without difficulties by making use of mode input/output terminals in the same way as in mounting subsidiary chips.

In the present embodiment, the face-to-face packaging technique is used. Other packaging techniques may be used.

If a special module having terminals and circuits for controlling subsidiary chips is designed to be incorporated into a mother chip, this facilitates packaging of a plurality of subsidiary chips.

The invention claimed is:

1. A semiconductor integrated circuit comprising:
   (a) a first chip having thereon terminals; and
   (b) a second chip having thereon terminals connected with said terminals of said first chip;
      said second chip including means for outputting information descriptive of a structure for said second chip; and
      said first chip including means for receiving said second chip structure information and for determining whether to use a terminal of said first chip,
      said first chip further including means for outputting information descriptive of a structure for said first chip;
      said second chip further including means for receiving said first chip structure information and for specifying, based on said first chip structure information, a structure for said second chip.

2. A semiconductor integrated circuit of claim 1 wherein said first chip and said second chip are mounted with a principal surface of said first chip and a principal surface of said second chip facing each other.

3. A semiconductor integrated circuit of claim 2 wherein a part of the terminal locations of said first and second chips is standardized.

4. A semiconductor integrated circuit comprising:
   (a) a first chip having thereon terminals;
   (b) a second chip having thereon terminals connected with said terminals of said first chip;
      said second chip including:
         a memory; and
         a mode output circuit for holding information descriptive of a structure for said memory and for outputting said memory structure information; and
      said first chip including:
         a mode input circuit for receiving said memory structure information from said mode output circuit and for determining whether to use a terminal of said first chip based on said memory structure information,
      wherein said mode output circuit of said second chip has a permanent storage element capable of setting information from the outside, said permanent storage element holding said memory structure information.

5. A semiconductor integrated circuit of claim 4 wherein said memory structure information indicates the storage capacity of said memory.

6. A semiconductor integrated circuit of claim 4 wherein said memory structure information indicates the type of said memory.

7. A semiconductor integrated circuit of claim 4 wherein said memory structure information indicates the cycle of refreshing of said memory.

8. A semiconductor integrated circuit of claim 4 wherein said first chip additionally includes a mode output circuit for holding information descriptive of a structure for said first chip and for outputting said first chip structure information, and wherein said second chip additionally includes a mode input circuit for receiving said first chip structure information from said first chip and for specifying, based on said first chip structure information, a structure for said second chip.

9. A semiconductor integrated circuit of claim 8 wherein said mode output circuit of said first chip has a permanent storage element capable of setting information from the outside, said permanent storage element holding said first chip structure information.

10. A semiconductor integrated circuit of claim 8 wherein said first chip structure information indicates the number of terminals required for data communication between said first chip and said memory.

11. A semiconductor integrated circuit of claim 4 wherein said first chip and said second chip are mounted with a principal surface of said first chip and a principal surface of said second chip facing each other.

12. A semiconductor integrated circuit of claim 11 wherein a part of the terminal locations of said first and second chips is standardized.

* * * * *